US008582737B2

(12) United States Patent
Lawson et al.

(10) Patent No.: US 8,582,737 B2
(45) Date of Patent: Nov. 12, 2013

(54) SYSTEM AND METHOD FOR RUNNING A MULTI-MODULE TELEPHONY APPLICATION

(75) Inventors: Jeffrey Lawson, San Francisco, CA (US); John Wolthuis, San Francisco, CA (US); Evan Cooke, San Francisco, CA (US)

(73) Assignee: Twilio, Inc., San Francisco, CA (US)

( * ) Notice: Subject to any disclaimer, the term of this patent is extended or adjusted under 35 U.S.C. 154(b) by 164 days.

(21) Appl. No.: 12/900,411

(22) Filed: Oct. 7, 2010

(65) Prior Publication Data

US 2011/0081008 A1    Apr. 7, 2011

Related U.S. Application Data

(60) Provisional application No. 61/249,491, filed on Oct. 7, 2009.

(51) Int. Cl.
*H04M 15/00*     (2006.01)

(52) U.S. Cl.
USPC ............ 379/114.03; 379/114.02; 379/114.04; 379/114.05; 379/114.06

(58) Field of Classification Search
USPC .................................................. 379/111–141
See application file for complete search history.

(56) References Cited

U.S. PATENT DOCUMENTS

| | | |
|---|---|---|
| 5,274,700 A | 12/1993 | Gechter et al. |
| 5,526,416 A | 6/1996 | Dezonno et al. |
| 5,581,608 A | 12/1996 | Jreij et al. |
| 5,598,457 A | 1/1997 | Foladare et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,223,287 B1 | 4/2001 | Douglas et al. |
| 6,269,336 B1 | 7/2001 | Ladd et al. |
| 6,425,012 B1 | 7/2002 | Trovato et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,493,558 B1 | 12/2002 | Bernhart et al. |

(Continued)

FOREIGN PATENT DOCUMENTS

| | | | |
|---|---|---|---|
| DE | 1684587 A | 3/1971 | |
| EP | 0282126 A | 9/1988 | |

(Continued)

OTHER PUBLICATIONS

Complaint for Patent Infringement, *Telinit Technologies, LLC* v. *Twilio Inc.*, dated Oct. 12, 2012.

*Primary Examiner* — Duc Nguyen
*Assistant Examiner* — Ibraham Sharifzadeh
(74) *Attorney, Agent, or Firm* — Jeffrey Schox; Brian Van Osdol (57) ABSTRACT

A method for running an accountable multi-module telephony application including receiving an application request to a number associated with an account of a telephony platform; directing application control to a first module of an application of the account; passing application control from the first module to a second module of the account through a linking system; and metering use of the first module and the at least second module independently.

22 Claims, 11 Drawing Sheets

(56) References Cited

U.S. PATENT DOCUMENTS

| | | | |
|---|---|---|---|
| 6,496,500 B2 | 12/2002 | Nance et al. |
| 6,501,832 B1 | 12/2002 | Saylor et al. |
| 6,507,875 B1 | 1/2003 | Mellen-Garnett et al. |
| 6,600,736 B1 | 7/2003 | Ball et al. |
| 6,606,596 B1 | 8/2003 | Zirngibl et al. |
| 6,625,258 B1 | 9/2003 | Ram et al. |
| 6,625,576 B2 | 9/2003 | Kochanski et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,829,334 B1 | 12/2004 | Zirngibl et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,985,862 B2 | 1/2006 | Stroem et al. |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,062,709 B2 | 6/2006 | Cheung |
| 7,076,428 B2 | 7/2006 | Anastasakos et al. |
| 7,089,310 B1 | 8/2006 | Ellerman et al. |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Rasanen |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,298,732 B2 | 11/2007 | Cho |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,330,890 B1 | 2/2008 | Partovi et al. |
| 7,340,040 B1 | 3/2008 | Saylor et al. |
| 7,369,865 B2 | 5/2008 | Gabriel et al. |
| 7,376,223 B2 | 5/2008 | Taylor et al. |
| 7,376,586 B1 | 5/2008 | Partovi et al. |
| 7,376,740 B1 | 5/2008 | Porter et al. |
| 7,412,525 B2 | 8/2008 | Cafarella et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,457,397 B1 | 11/2008 | Saylor et al. |
| 7,486,780 B2 | 2/2009 | Zirngibl et al. |
| 7,496,054 B2 | 2/2009 | Taylor |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,552,054 B1 | 6/2009 | Stifelman et al. |
| 7,571,226 B1 | 8/2009 | Partovi et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,672,295 B1 | 3/2010 | Andhare et al. |
| 7,675,857 B1 | 3/2010 | Chesson |
| 7,962,644 B1 * | 6/2011 | Ezerzer et al. ............... 709/238 |
| 8,081,958 B2 | 12/2011 | Soederstroem et al. |
| 8,121,261 B2 * | 2/2012 | McQueen ................ 379/88.06 |
| 8,126,128 B1 * | 2/2012 | Hicks et al. ............. 379/201.05 |
| 2002/0006124 A1 | 1/2002 | Jimenez et al. |
| 2002/0077833 A1 | 6/2002 | Arons et al. |
| 2002/0126813 A1 | 9/2002 | Partovi et al. |
| 2003/0006137 A1 | 1/2003 | Wei et al. |
| 2003/0026426 A1 | 2/2003 | Wright et al. |
| 2003/0046366 A1 | 3/2003 | Pardikar et al. |
| 2003/0059020 A1 | 3/2003 | Meyerson et al. |
| 2003/0061404 A1 | 3/2003 | Atwal et al. |
| 2004/0071275 A1 | 4/2004 | Bowater et al. |
| 2004/0101122 A1 | 5/2004 | Da Palma et al. |
| 2004/0172482 A1 | 9/2004 | Weissman et al. |
| 2004/0213400 A1 | 10/2004 | Golitsin et al. |
| 2005/0010483 A1 | 1/2005 | Ling |
| 2005/0135578 A1 | 6/2005 | Ress et al. |
| 2005/0177635 A1 | 8/2005 | Schmidt et al. |
| 2005/0240659 A1 * | 10/2005 | Taylor ........................ 709/217 |
| 2005/0246176 A1 | 11/2005 | Creamer et al. |
| 2006/0015467 A1 | 1/2006 | Morken et al. |
| 2006/0143007 A1 | 6/2006 | Koh et al. |
| 2006/0203979 A1 | 9/2006 | Jennings |
| 2006/0209695 A1 | 9/2006 | Archer et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0256816 A1 | 11/2006 | Yarlagadda et al. |
| 2006/0262915 A1 | 11/2006 | Marascio et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0050306 A1 * | 3/2007 | McQueen ...................... 705/77 |
| 2007/0070906 A1 | 3/2007 | Thakur |
| 2007/0070980 A1 | 3/2007 | Phelps et al. |
| 2007/0121651 A1 | 5/2007 | Casey et al. |
| 2007/0127703 A1 | 6/2007 | Siminoff |
| 2007/0133771 A1 | 6/2007 | Stifelman et al. |
| 2007/0192629 A1 | 8/2007 | Saito |
| 2007/0208862 A1 * | 9/2007 | Fox et al. ..................... 709/227 |
| 2007/0242626 A1 * | 10/2007 | Altberg et al. ................ 370/259 |
| 2007/0265073 A1 | 11/2007 | Novi et al. |
| 2007/0291905 A1 | 12/2007 | Halliday et al. |
| 2008/0104348 A1 | 5/2008 | Kabzinski et al. |
| 2008/0134049 A1 | 6/2008 | Gupta et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0165708 A1 | 7/2008 | Moore et al. |

(56) References Cited

U.S. PATENT DOCUMENTS

| | | |
|---|---|---|
| 2008/0232574 A1 | 9/2008 | Baluja et al. |
| 2008/0313318 A1 | 12/2008 | Vermeulen et al. |
| 2008/0317222 A1 | 12/2008 | Griggs et al. |
| 2009/0052437 A1 | 2/2009 | Taylor |
| 2009/0052641 A1 | 2/2009 | Taylor |
| 2009/0074159 A1 | 3/2009 | Goldfarb et al. |
| 2009/0089699 A1 | 4/2009 | Saha et al. |
| 2009/0136011 A1 | 5/2009 | Goel |
| 2009/0171659 A1 | 7/2009 | Pearce et al. |
| 2009/0171669 A1 | 7/2009 | Engelsma et al. |
| 2009/0220057 A1 | 9/2009 | Waters |
| 2009/0222341 A1 | 9/2009 | Belwadi et al. |
| 2009/0225748 A1 | 9/2009 | Taylor |
| 2009/0232289 A1 * | 9/2009 | Drucker et al. .......... 379/114.03 |
| 2009/0252159 A1 | 10/2009 | Lawson et al. |
| 2010/0037204 A1 | 2/2010 | Lin et al. |
| 2010/0082513 A1 | 4/2010 | Liu |
| 2010/0088698 A1 | 4/2010 | Krishnamurthy |
| 2010/0142516 A1 | 6/2010 | Lawson et al. |
| 2010/0150139 A1 | 6/2010 | Lawson et al. |
| 2010/0232594 A1 | 9/2010 | Lawson et al. |
| 2010/0235539 A1 | 9/2010 | Carter et al. |
| 2010/0251329 A1 | 9/2010 | Wei |
| 2011/0078278 A1 | 3/2011 | Cui et al. |
| 2011/0081008 A1 | 4/2011 | Lawson et al. |
| 2011/0083179 A1 | 4/2011 | Lawson et al. |
| 2011/0176537 A1 | 7/2011 | Lawson et al. |
| 2011/0280390 A1 | 11/2011 | Lawson et al. |
| 2011/0283259 A1 | 11/2011 | Lawson et al. |
| 2011/0320550 A1 | 12/2011 | Lawson et al. |
| 2012/0036574 A1 | 2/2012 | Heithcock et al. |
| 2012/0281536 A1 | 11/2012 | Gell et al. |

FOREIGN PATENT DOCUMENTS

| | | |
|---|---|---|
| EP | 1464418 A | 10/2004 |
| EP | 1770586 A1 | 4/2007 |
| ES | 2134107 A | 9/1999 |
| WO | 02087804 | 11/2002 |
| WO | 2009018489 A | 2/2009 |
| WO | 2009124223 A | 10/2009 |
| WO | 2010037064 A | 4/2010 |
| WO | 2010040010 A | 4/2010 |
| WO | 2010101935 A | 9/2010 |
| WO | 2011091085 A | 7/2011 |

* cited by examiner

SYSTEM AND METHOD FOR RUNNING A MULTI-MODULE TELEPHONY APPLICATION

CROSS-REFERENCE TO RELATED APPLICATIONS

This application claims the benefit of US Provisional Application No. 61/249,491, filed 7 Oct. 2009, titled "SYSTEM AND METHOD FOR CUSTOMIZED TELEPHONY APPLICATIONS" which is incorporated in its entirety by this reference.

TECHNICAL FIELD

This invention relates generally to the telephony field, and more specifically to a new and useful system and method of a customized telephony application in the telephony field.

BACKGROUND

Traditional telephony applications, such as Interactive Voice Response (IVR) and Private Branch Exchange (PBX) systems, are used to provide customized telephone services (e.g., an automated phone directory, bill paying, or account info). A telephone application is generally launched through phone actions such as pressing a phone key (e.g., "5") or speaking a phrase. Performing a phone action may launch another IVR or PBX server hosting a different application. When using such a system, multiple telephone applications need to be individually configured and integrated to achieve a desired functionality. In some situations a single company will offer a variety of first party applications that are designed to work together, but in this situation, the available application options are often limited. In other situations, the applications are sold and operated by different companies. The applications of different companies may use different telephony hardware and software stacks, which prevents the ability to transfer call state, meta-data, or call control between applications. Additionally, each of these services may have separate billing contracts and operation costs, which not only can become financially expensive, but also is bothersome to manage. Additionally, there are many technology platforms, such as telephony platforms, web service platforms, and other technology platforms, that have numerous third party developing tools on top of, and it is often challenging for the technology platform provider and/or the third party developers to create a profitable product due to the complicated relationship between users, technology providers, and products. Thus, there is a need in the telephony application field to create a new and useful system and method for running a multi-module telephony application. This invention provides such new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Method for Running a Multi-Module Telephony Application

Figure 1:
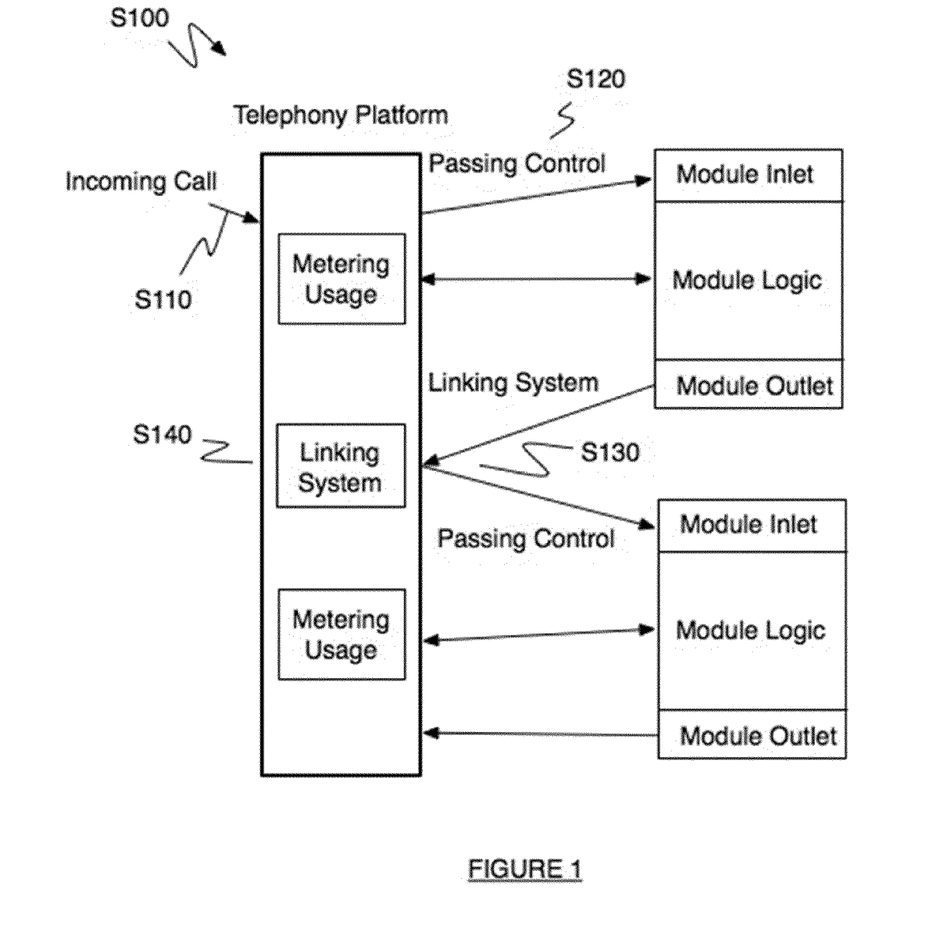
FIG. 1 is a schematic representation of a first preferred embodiment of a deployed customized telephony application.

As shown in FIG. 1, a method S100 for running a multi-module telephony application of a preferred embodiment includes receiving an application request to a number associated with an account of a telephony platform S110; directing application control to a first module of an application of the account S120, passing application control from the first module to a second module of the account through a linking system S130, and metering use of the first module and the at least second module S140. The method S100 functions to allow an application to have the functionality of multiple modules linked so application control can be passed between modules. The method S100 further functions to allow highly customized telephony applications to use modules (or applets) developed and operated by any suitable party. The modules can preferably be customized within a container app (or some abstraction of overall flow between modules) that determines overall configuration in module flow. The modules may vary in functionality and performance. The customization process is preferably facilitated by an online store, but any customization environment may alternatively be used. The method S100 further provides ways for modules to pass parameters and share state information. The different modules may be developed by any suitable entity such as third party developers or operators of the telephony platform. The method S100 is preferably implemented on the telephony platform substantially similar to the telephony platform described in US U.S. Patent Application publication no. 2009/0252159, filed Apr. 2, 2009, titled "SYSTEM AND METHOD FOR PROCESSING TELEPHONY SESSIONS" which is incorporated in its entirety by this reference, but the method may alternatively be used by any suitable telephony platform. The method further functions to enable a module to be used by users on a usage based technology platform. An additional benefit of the method S100 is that usage of a module is individually metered which can preferably be used to simplify the payment process. Preferably, the design of the system, as described below, and the method of use allows for outside developers to easily create and operate telephony application modules without performing complicated tasks to manage state of the call or coordinating with other module developers for how to communicate and collaborate within an application.

Figure 2:
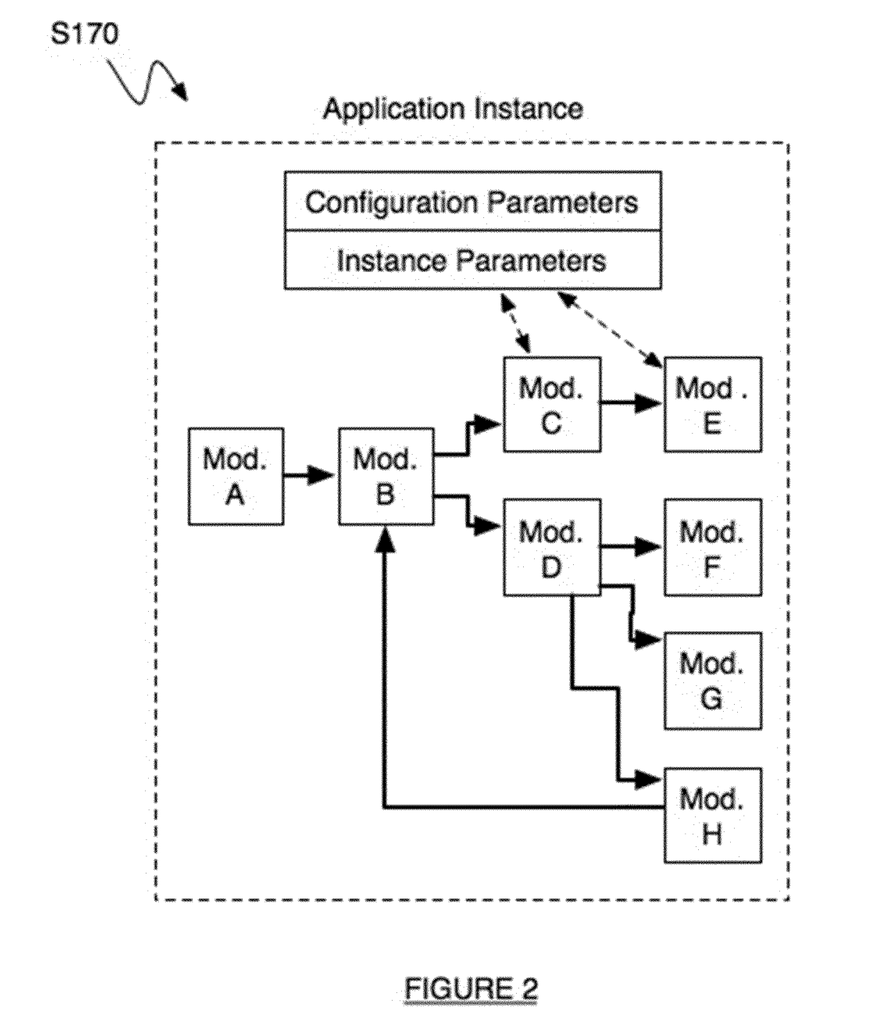
FIG. 2 is a schematic representation of a configured telephony application.
Figure 3:
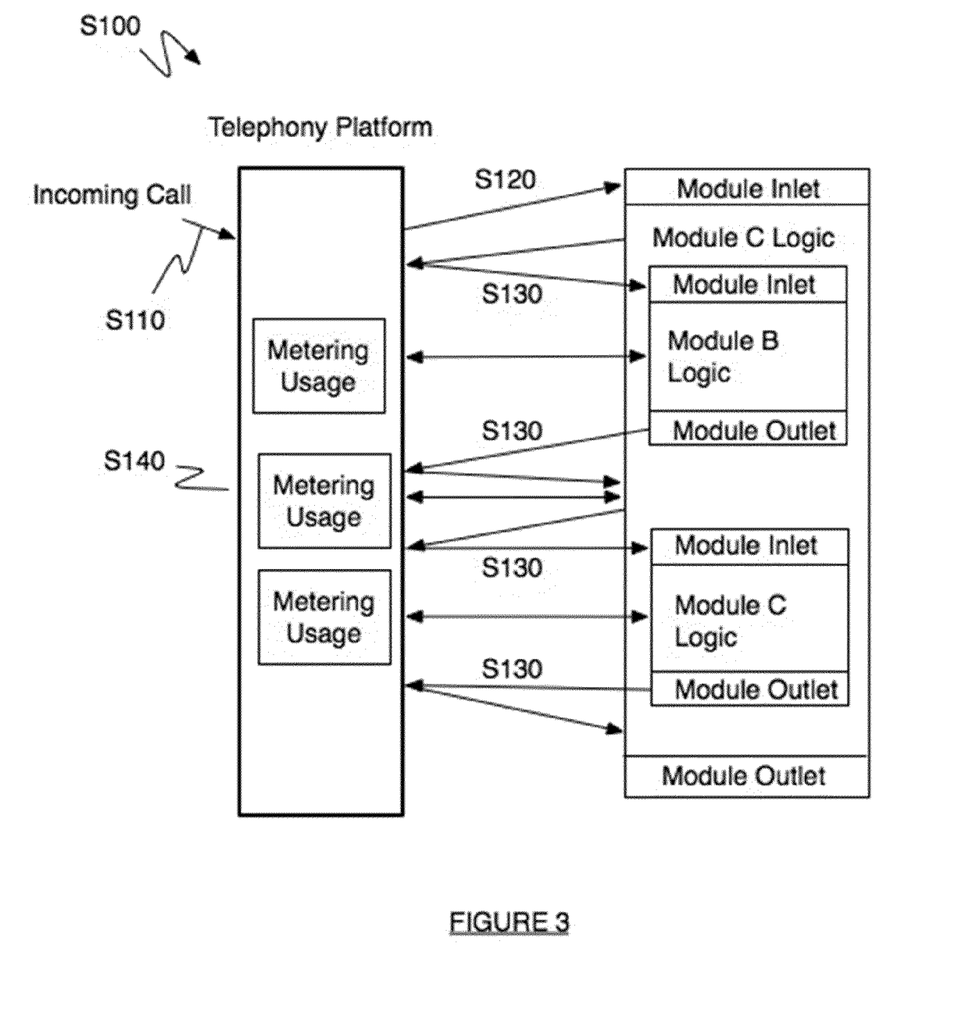
FIG. 3 is a schematic representation of a variation where a first module uses a second and third module within the operation logic of the first module.
Figure 9:
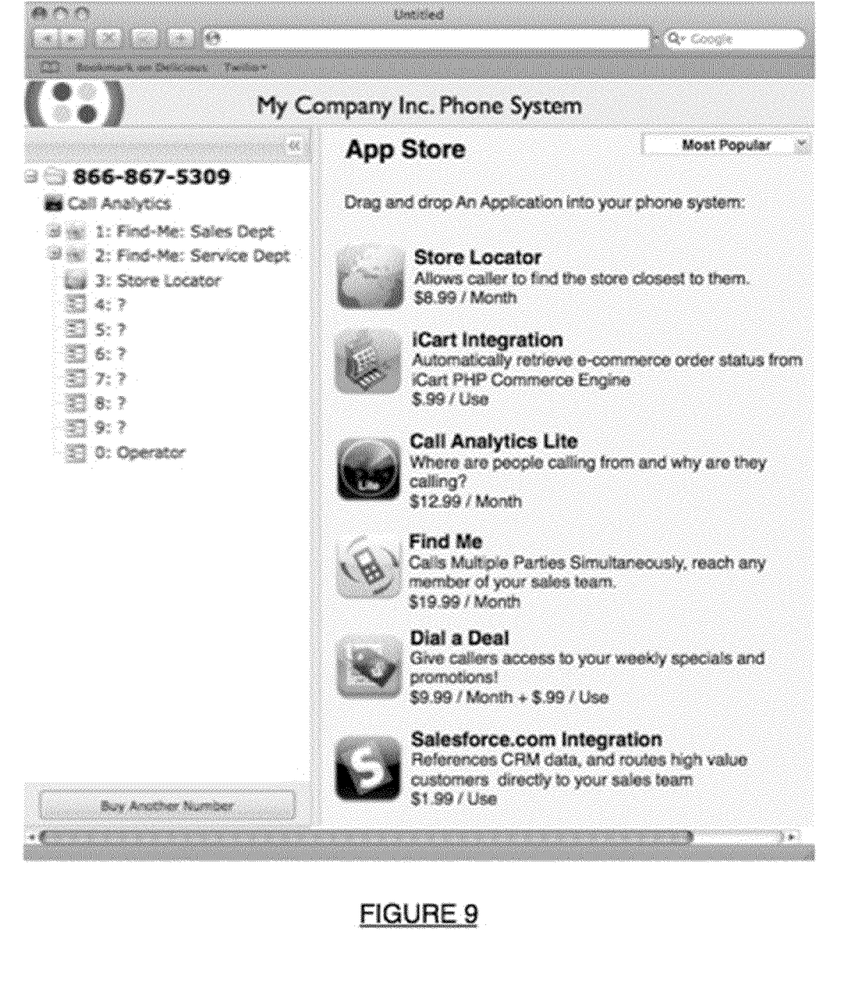
FIGS. 9 and 10 are exemplary representations of screenshots of a customization interface for an application composed of a plurality of modules.
Figure 10:
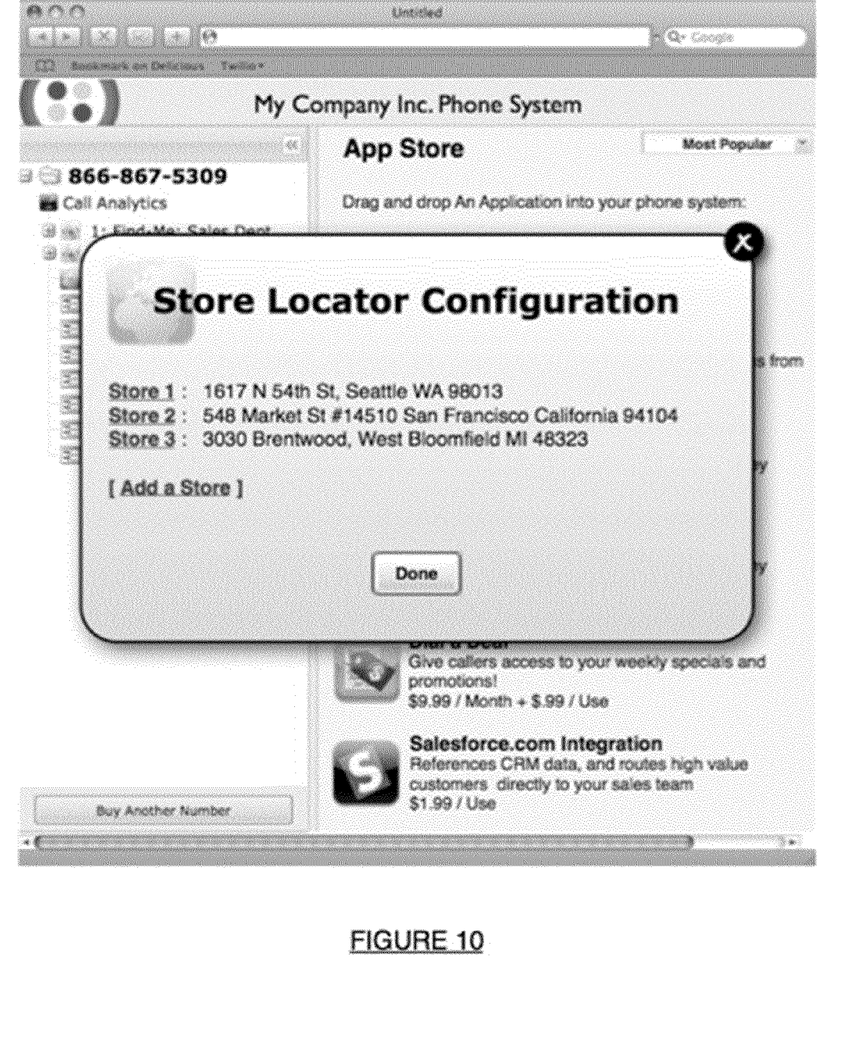

Step S110, which includes receiving an application request to a number associated with an account of a telephony platform, functions to handle an incoming request to the telephony platform. The application request is preferably an incoming phone call which may be a phone call from the public switched telephone network (PSTN), a voice over internet protocol (VoIP), or any suitable telephone network. The application request may alternatively be a request made from a telephony message such as a message received over short message service (SMS), a multimedia messaging service (MMS), or any suitable messaging service. As another alternative, the application request may be over fax or any suitable communication channel. Additionally or alternatively, the application request may be initiated from a web application or a server, such as in the example where an outgoing phone call is initiated by the web application. The incoming application request is preferably directed to an application assigned to a phone number. The application is preferably composed of at least one module. The at least one module is preferably configured to direct application control to at least one other module. The second module that the first module directs application control to may be determined through the application logic of the module. More preferably, the application is preconfigured to include a plurality of modules that have a configured flow as shown in FIG. 2. A user customized application which may be described as being defined by a "container application", may be setup through a user interface that links the different modules and defines the functionality and operation parameters of the modules as shown in FIGS. 9 and 10. The modules may be developed by any suitable party. For example, the functionality of an application may utilize one module by a company A which can pass application control to a second module by company B. These modules are preferably stored outside of the telephony platform (e.g., on a server determined by the respective developers/owners), but the modules may alternatively be stored within the telephony platform. Additionally, similar to how one application may be configured to use a plurality of modules, a module may itself be configured to use a plurality of other modules as shown in FIG. 3.

Step S120, which includes directing application control to a first module of an application of the account, functions to direct the telephony platform to communicate with the first module to determine application logic. Application control preferably includes the a server hosting the module communicating with a call router of the telephony platform or any other suitable portion of a telephony platform. Directing application control to the first module preferably includes having the call router communicate with the module at a Universal Resource Identifiers (URI). The module is preferably stored on an application server but the module may alternatively be stored in any suitable location. Modules preferably have a specified initial URI (i.e., a module inlet). The URI may be a resource indicator for Hypertext Transfer Protocol (HTTP), Session Initiation Protocol (SIP) or any suitable communication protocol. As described more below, the initial URI may additionally be used to pass operation parameters to the module. In some variations, the operation parameters may be information to determine what module will be passed application control. In this variation, a single URI can be used to define the application configuration for a plurality of modules.

Figure 4:
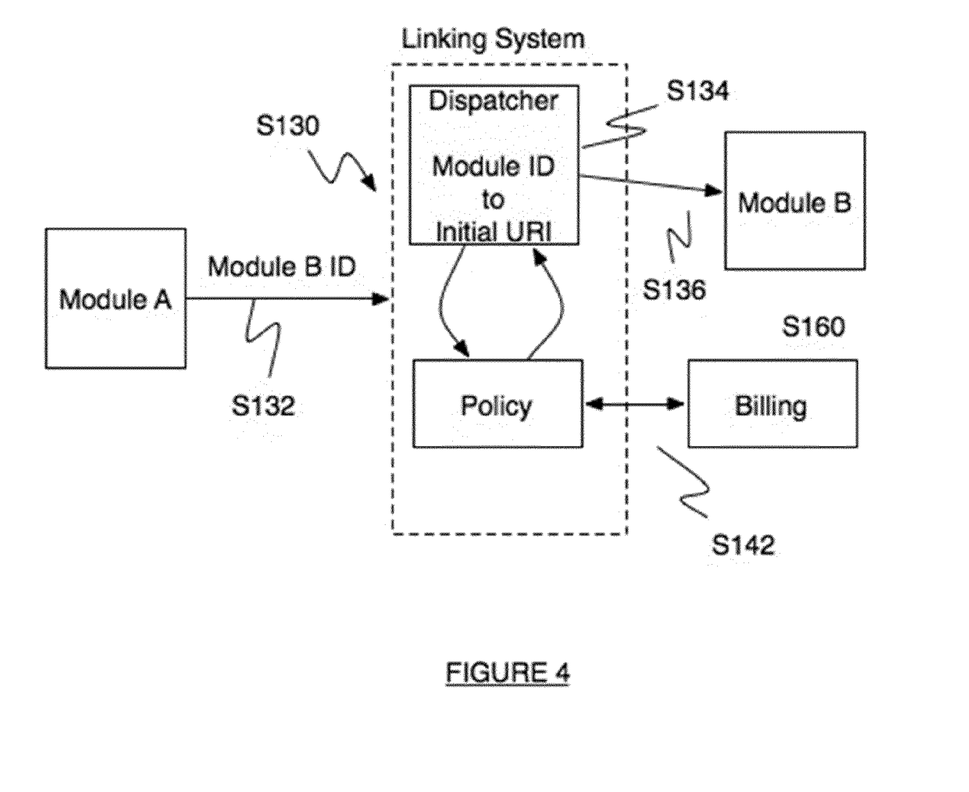
FIG. 4 is a schematic representation of a preferred linking system.

Step S130, which includes passing application control from the first module to a second module of the account through a linking system, functions to transfer the application control as viewed by the telephony platform to a second module. The passing of application control is preferably initiated through programmatic logic of the first module such as entering an operational state or some action. This module state or action can be thought of an outlet. There may be a plurality of outlets of which application control may be passed to varying modules. As an example, a phone tree module may have the actions of various dual-tone multi-frequency (DTMF) (or alternatively speech recognition phrases) assigned to different modules that will be passed control if that action is taken. As discussed above, the first and second module may be operated by any suitable party, and the second module preferably does not need to have any knowledge of the first module to be passed control. Operation of the first module is additionally independent of the second module, except that the mechanism of the linking system may require being implemented by the first module. The linking system may be operated in a number of ways. In a first variation, the linking system includes performing a URI redirect to the initial URI of the second module. For example, the first module will issue a command to the telephony platform to next communicate with the initial URI of the second module instead of a URI of the first module. The redirect URI (the initial URI of the second module) may be stored by the first module. The URI redirect may alternatively be preloaded through the initial URI of the first module. So one initial URI may include all the application logic to use a plurality of modules by embedding the application configuration parameters in the initial URI of the first module. As a second variation shown in FIG. 4, the linking system may include using a dispatcher engine that performs the steps of passing a module identity code of the second module to a dispatcher engine of the telephony platform S132; converting the code to a URI for the second module S134; and directing call control to the second module at the URI for the second module S136. The module identity code is any suitable representation of the second module. Each module usable by the telephony platform is preferably assigned a module identity code. The dispatcher engine is preferably a service ran on the telephony platform that maps module identity codes to initial URI's of modules. The module identity codes functions to allow the location of the module to be aliased so that a developer may change the location and setup of a module without breaking links to an initial URI that other modules include. The dispatcher engine may additionally provide a level of security such that use of a module may not be achieved if it is not allowed. As yet another variation, the dispatching engine may store module-to-module flows in an application configuration datastore (i.e., a container app), and the first module preferably signals that the next module (or module of a particular outlet) should be transferred control. In this variation, the first module may not have knowledge of what module is being linked to. The application configuration datastore preferably includes aliasing of the initial URI's of modules and will direct application control to appropriate initial URI. The dispatching engine preferably additionally works in cooperation with a policy engine that determines if application control is allowed and/or a billing engine that uses a designated usage model for billing management of various parties as shown in FIG. 4. The policy engine and the billing engine are discussed below. The dispatcher engine and the policy engine preferably cooperate to determine where application control should be directed and if application control should be allowed for the particular user account. The billing engine is preferably used in combination with the policy engine to determine billing factors that would prevent module access.

Step S140, which includes metering use of the first module and the at least second module, functions to account for the different modules of the application separately. The first and second module usage of the telephony application for a user account is preferably individually metered. The independent metering can preferably be achieved because use of the telephony platform during application control by each module is preferably isolated and accountable. The telephony platform (e.g., a call router) can preferably track what module URI's are being used for application control, and more preferably the dispatching engine or the policy engine preferably tracks application control. In addition to metering application control, actions outside of application control (asynchronous usage) may be monitored. For example, API calls made by a module or other use of the telephony platform that do not relate to an instance of application control may be included in the metered activity. Metering preferably includes maintaining usage statistics. The metrics used for metering preferably may include per "period use" (e.g., unlimited usage for one month), amount of usage in a fixed period (e.g., 100 minutes of call time per month or 500 text messages in a month), or a usage limit (e.g., 500 text messages), or any suitable usage model. Alternatively, the metering may include noting that a module is in use during a particular period. This may be used for a usage model with unlimited use in a time period. Preferably the comparison of time period of unlimited use and the current time is used in verifying permission for the account to use a module. For example, if a usage model is set so that the module may see unlimited use during month period, the metering preferably notes that the month is being used in a particular month, and a policy engine preferably verifies permission for an account to be used that month (e.g., check if the current date is included in the month of unlimited use). This particular alternative may be further used during the configuration of telephony application. A particular module may not be prevented from being configured within a telephony application until the current time period is paid for. The metric used to measure usage of the first module and the second module can preferably differ, such that the usage model of each module may be individually assigned.

Figure 5:
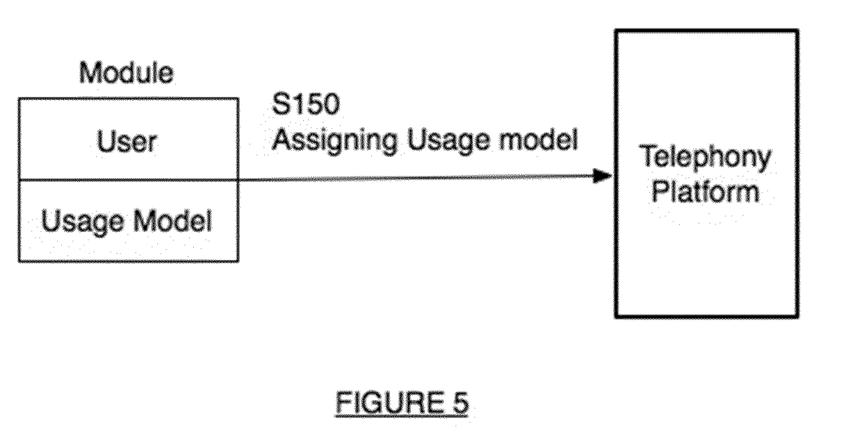
FIGS. 5 and 6 are schematic representations of assigning a usage model.
Figure 6:
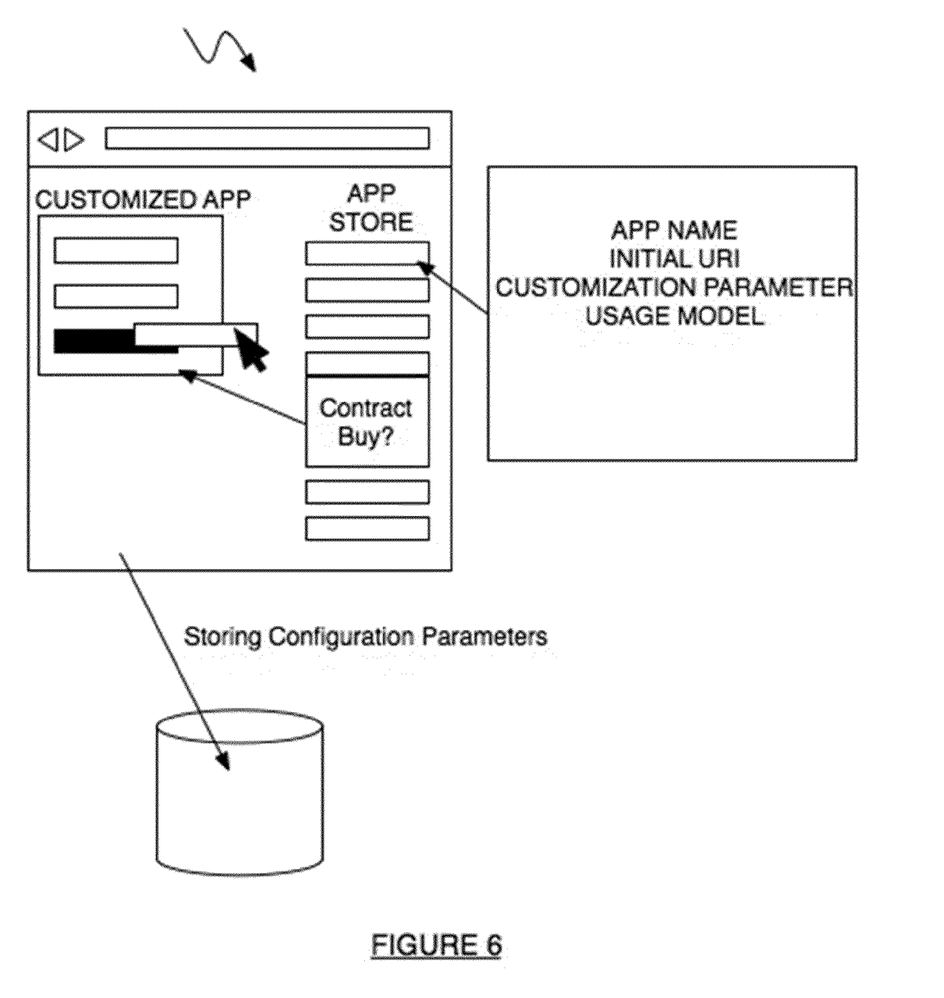

As an additional step of the preferred embodiment shown in FIGS. 5 and 6, the method S100 may include assigning a usage model of the account for the first module and the second module S150, and prior to directing application control to the initial URI of the second module, a policy engine verifying permission for the account to use the second module S142. The usage model of a module is preferably assigned during a prior configuration of the application and the information is stored for the application of the account. The usage model may be an agreement of what resources can and cannot be used but preferably includes a billing agreement that specifies a pricing model for the use of the module. When verifying permission, the policy engine is preferably checking that the users usage model is being followed. Conditions for permission may include having a fully paid account, having current billing information, having funds in an account, or any suitable condition. Other permission rules may additionally be included such as categorization of user, banned user lists or any suitable permission setting. In some cases the policy engine may need to communicate with the billing engine to obtain information pertinent to the rules for permitting usage. The policy engine is preferably used when the linking system is being used when passing of application control is made between two modules. The policy engine and the dispatcher engine may be used in any suitable order or configuration.

Figure 7:
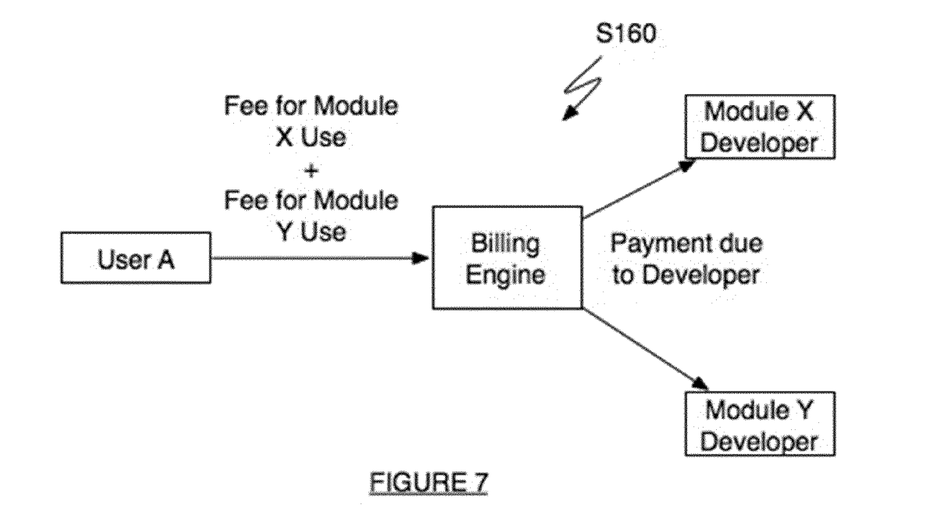
FIGS. 7 and 8 are schematic representations of transferring payment.
Figure 8:
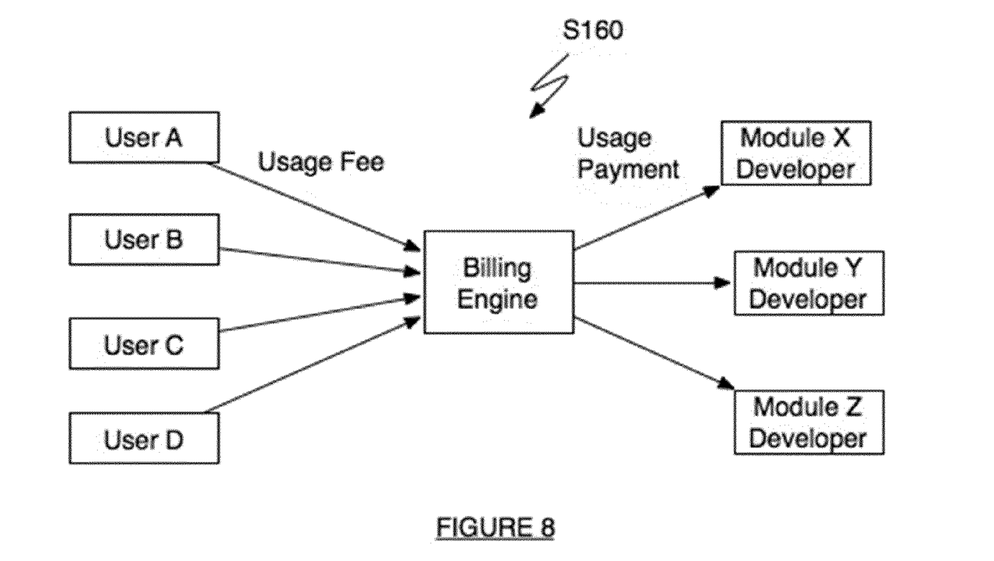

As an additional step of the preferred embodiment, the method S100 may include a billing engine that performs the steps including transferring payment from an account based on a usage model for the first module and the second module S160, which functions to charge accounts and/or pay entities based on independent usage models and metered usage by a first module and at least second module. The billing engine preferably provides a simplified billing process for applications composed of multiple modules. A user account may enter numerous subscriptions/contracts with different entities when using an application with a plurality of modules, but the billing engine is preferably used to consolidate the different usage models so that the user pays a single bill for all module use as shown in FIG. 7. Similarly, developers, owners, or any entity associated with the module has simplified billing procedure by preferably having the cost of telephony platform use and payment from a plurality of user accounts consolidated into a single payment as shown in FIG. 8. Preferably, transferring of payment from an account includes charging the user account for combined usage of the first module and the at least second module as indicated by the metered use of the first module and at least second module and distributing payment to an entity of the first module based on usage record of the first module and distributing payment to an entity of the second module based on a usage record of the second module. When distributing payment to an entity of a module, there may be some portion of payment that the telephony platform receives, and thus the payment delivered may factor in this cost. This preferably enables the telephony platform provider to act as a single point of billing even though each user may have numerous contracts with different module operators. The user account instead of paying numerous bills each with possibly different usage plans, pays just the telephony platform provider, and the developers. Similarly, operators of the modules receive a payment from the telephony platform instead of developing their own infrastructure to track usage of the module and also implementing their own billing system. Additionally, the billing engine preferably cooperates with the policy engine so that the policy engine may verify the user account has satisfied the billing requirements. These billing requirements may be for the overall application but may be for each module individually.

As previously discussed, the method may include sharing state information of the first and the at least second module S170. Each module can preferably have individual configuration parameters, which may be stored by the module operators, on the telephony platform, or through any suitable device. The configuration parameters combine to form a configuration state. Additionally, the application as defined by the collection of modules may have configuration parameters. The application configuration parameters may be the flow of the modules in the application, but may alternatively be variables that are globally available to the modules of the application. For example, an account ID, a call number, text message, and/or any suitable parameter may be available to the modules. The configuration parameters in one variation are passed through the initial URI's of the modules that is used when passing application control. For example, settings for a simultaneous ring app may have two phone numbers, 415-555-1234 and 415-555-6789. Rather than storing and accessing these settings from a database the applet reference may have them embedded in the reference such as:

http://twimlets.com/simulring?PhoneNumbers[0]=415-555-1234&PhoneNumbers[1]=415-555-6789&.

As another variation, the parameters may be accessible through an API call to the telephony platform where the configuration parameters are stored. A presassigned key value pairing may be provided for use by the modules. In a variation where multiple instances of the same module are used, settings may be setup globally for all instances or saved individually for each instance of a module. Settings and information that may be collected may include phone numbers, email addresses, sound files, text (to read with a text-to-speech service), URIs to other media, other module references (initial URI's), or any suitable inputs. In addition to configuration parameters that may be set for every application use, instance parameters (i.e., parameters that are unique for every phone call or text message or application use) may additionally be shared through similar techniques. After application control has been passed to the second module, then telephony platform requests are preferably sent to a URI of the second module.

Additionally, the telephony platform may include a notification engine that preferably performs the step of notifying a module of activity on the telephony platform. The notification engine preferably sends an event notification during any suitable event. Such events may include an incoming call to an application, an end to an application instance, a billing event, or any suitable event.

2. A Method for Providing Metered API Access

Figure 11:
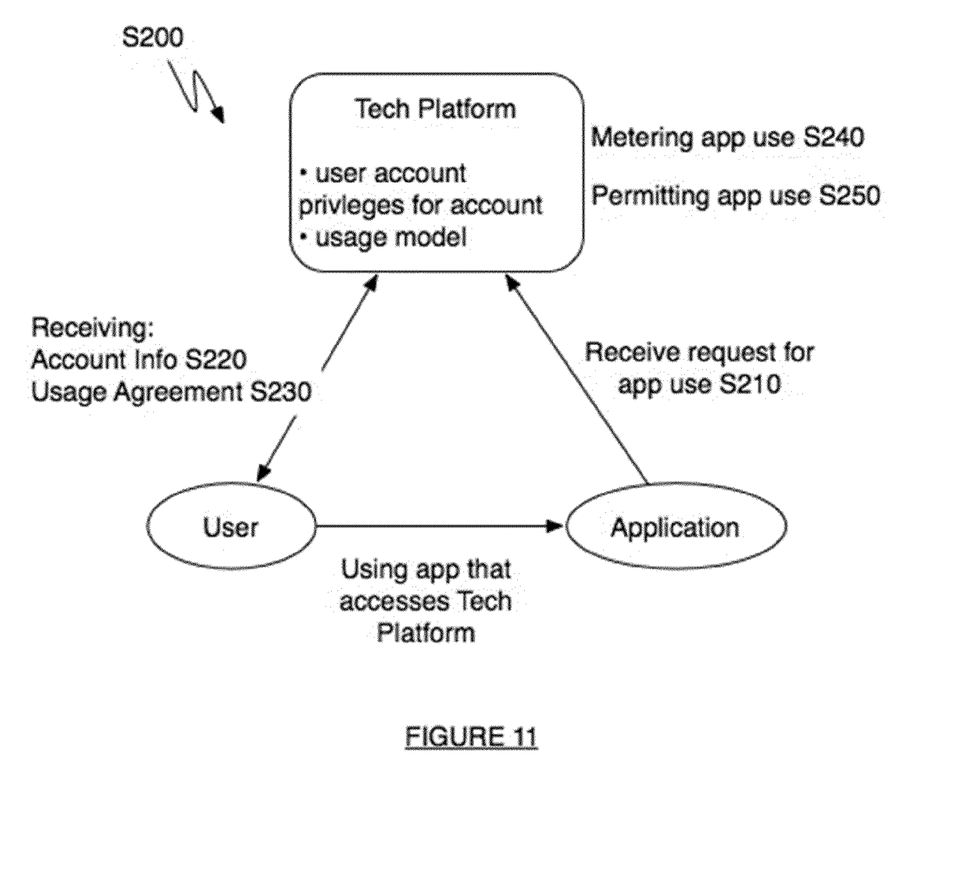
FIG. 11 is a schematic representation of a second preferred embodiment of providing metered API access.

As shown in FIG. 11, a method S200 for providing metered API access of a second preferred embodiment preferably includes receiving a request to add an application for use on a platform S210, receiving user account information for the platform S220, receiving usage agreement information for the user account S230, metering the application usage for the account S240, and permitting use of a platform resource for the user account according to the metered usage and usage agreement S250. The method S200 preferably functions to enable a single application to be used by users of a usage based technology platform. The technology platform may be any paid platform such as an API (a REST API, SOAP API or any suitable API) or may alternatively have usage limits. More preferably, the technology platform is a paid or usage based platform where usage of the technology platform either by the user or of the application is of importance to the services provided. There may be usage limitations or alternatively billing requirements based on usage. Method S200 can preferably by used with the method S100 above for the modules of an application, and method S200 may additionally be used for a telephony platform, and used in a manner substantially similar to the method S100. But the method S200 can preferably be used with standalone applications such as a third party mobile app that uses a web service. For example a social network that wants to charge for third party mobile phone application access to the social network API could use method S200. The method S200 can preferably be performed by a system as in the above method that includes a policy engine, a billing engine, and/or a dispatcher engine. The method S200 may additionally be extended for use with a plurality of applications associated with a user account, where the user is accountable for different usage models of each application, as in the method S100.

Steps S210, S220, and S230, which include receiving a request to add an application for use on a platform, receiving user account information for the platform and, receiving usage agreement information for the user account, functions to authorize an application to access resources of an account and provide suitable usage metering. This process can be setup similar to other authorization processes such as oauth. However, the process additionally includes receiving usage agreement information. The usage agreement information may be a variety of items depending on the particular technology platform. Preferably, the usage agreement information includes billing information and an agreed upon usage plan. The usage plan may be a fee per time period, a fee per amount of resource use, fee per amount of time, or any suitable usage model. In another variation, the usage agreement information may be an acknowledgement to the amount of use available to the user, such as a limit of data usage per time period. The Steps S210, S220, and S230 preferably result in an application receiving access to account resources on the technology platform and a usage model being setup for the user account of the application.

Step S240, which includes metering the application usage for the account, functions to create a record of the usage of the application by the user account. The metering is preferably substantially similar to the metering as performed in method S100. Metering of application usage may additionally be targeted to particular actions such as the number of times an API call is made or use during a particular time period. The technology platform preferably meters the activity by the application.

Step S250, which includes permitting use of a platform resource for the user account according to the metered usage and usage agreement, functions to regulate the use of the application by the user. A policy engine substantially similar to the one described above is preferably used for this step. The policy engine may additionally communicate with a billing engine to determine permission. In the method S100 above, this step preferably includes passing application control to a module (or application). In other alternatives, the permitting use of a platform may include allowing specific API calls or resources to be used by an application. Depending on the usage agreement information this may be limited to specific API calls or be overall access to the technology platform. When permission is not allowed, any suitable error message or action may be taken. Depending on the usage agreement, when access is not allowed because usage has reached a limit of the plan, a billing engine may automatically charge a user account to enable uninterrupted use of the technology platform. A billing engine may additionally perform steps substantially similar to the billing steps of method S100. The platform preferably collects payment from a user account and then distributes payment to the entity associated with the application (e.g., the developer). Users that utilize multiple applications on a technology platform can preferably receive a single bill, and developers of applications can similarly receive a consolidated payment for all users delivered by the telephony platform.

3. System for Customized Telephony Applications

Figure 12:
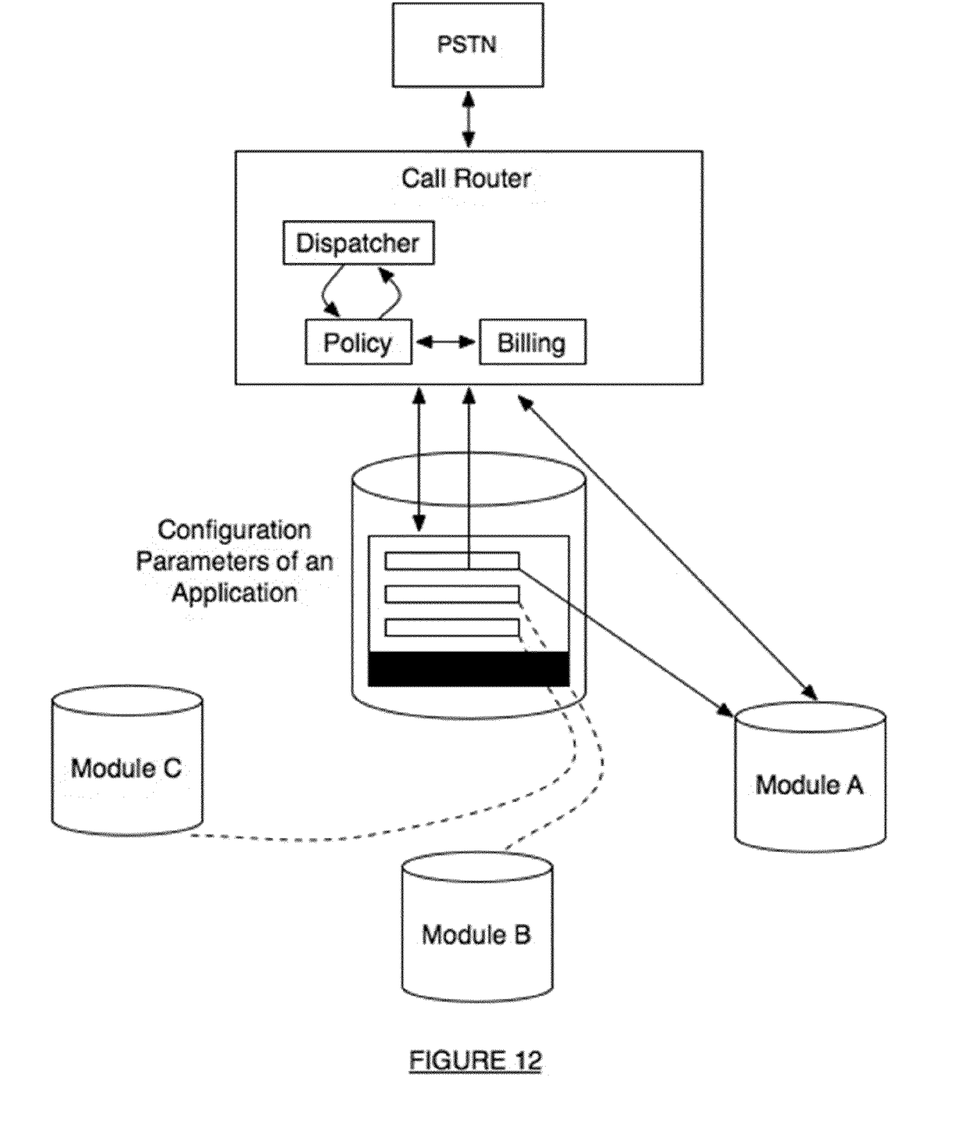
FIG. 12 is a schematic representation of a system of a preferred embodiment.

As shown in FIG. 12, a particular system for performing the above methods preferably includes a telephony platform with a linking system and a plurality of modules. The linking system preferably includes a dispatcher engine, a policy engine and a billing engine, but may contain any alternative combination or alternative components. The dispatcher engine preferably works to determine what initial URI to pass application control. The policy engine preferably enforces permissions and can communicate with the billing engine to determine billing related restrictions.

The call router functions to initiate or receive calls from a telephony device and to connect to a deployed container app and/or applet. The call router is preferably connected to a Public Switched Telephone Network (PSTN) device over the PSTN network, such that the call router can receive and make calls from PSTN-connected devices 21, such as landlines, cellular phones, satellite phones, or any other suitable PSTN-connected devices, as well as non-PSTN devices, such as Voice-Over-Internet-Protocol (VoIP) phones, SIP devices, Skype, Gtalk, or other Internet addressable voice devices. The call router may alternatively or additionally function as or include a message router for use with short message service (SMS) messages. The call router can preferably connect to an SMS network, such that it can receive and send messages from SMS network devices, cellular phones, computers, smartphones, or any suitable SMS network devices. The call router may also send or receive text messages, multimedia messages, emails, faxes and other suitable PSTN-compatible communication messages. The call router preferably communicates with the application or modules using an application layer protocol, more preferably using the HTTP, or secure HTTPS, protocol. SIP or any suitable internet protocol may alternatively be used. The communication between the module and the call router is preferably stateless and any state information (e.g., call state) or data is preferably located in a URI or the request parameters, such as HTTP headers, GET URI parameters, POST request body parameters, HTTP cookies, or in configuration parameters of the application or module. The call router 140 preferably stores state information in call router resources. The call router resources are preferably accessible by the application server and other devices through a call router API. The call router preferably associates each incoming phone number with a starting URI, The starting URI is preferably the location of the application or the initial module. Before a call is received at the call router, the starting URI is associated with the incoming call address (such as DID, SIP address, etc.) or by the application upon initiation of an outgoing call. The call router can preferably send call data such as the caller number (obtained via Caller ID), caller geographic data (country, city, and/or state, zip) the number dialed, the time of the call, or any other suitable information or parameter.

The module is preferably a resource such as document containing telephony instructions interpreted by the call router. The instructions are preferably translated into actions and handling of the telephone call, text message or other telephony communication. A module may provide any suitable functionality. Some exemplary modules may include a store locator, an e-commerce order status app, call analytics, a find-me application, an RSS feed powered app, a call directory and routing app, an advertising application that calls another applet reference after playing an advertisement, a voicemail app, menu app, a simultaneous call app, a find me app that calls a list of numbers until one of them is answered, or any suitable application. Developer modules can be remotely hosted at a site selected by the developer utilizing any suitable architecture, yet the modules can be made available in a single marketplace to provide better exposure, and lower the barrier of acceptance by potential customers.

The system may additionally include a billing engine that functions to manage and track telephony platform usage by a module to appropriately charge a user. The billing engine preferably tracks all modules according to set billing policies agreed to by a customer in a usage model. This may include tracking time of use, number of uses, or according to any suitable subscription model. The billing engine preferably consolidates all module fees for both the customers and the developers. It is envisioned that a customer may have multiple service agreements and contracts for various modules. The bills for the various modules are preferably consolidated into a single, periodic bill created and sent out by the billing engine. Similarly, it is envisioned that a developer may have a plurality of customers with varying agreements. The payments from the various customers are preferably consolidated into a single, periodic payment. Account information and billing information is preferably stored in any suitable database.

As a person skilled in the art will recognize from the previous detailed description and from the figures and claims, modifications and changes can be made to the preferred embodiments of the invention without departing from the scope of this invention defined in the following claims.

We claim:

1. A method for running an accountable multi-module telephony application comprising:

receiving an application request for a number associated with an account of a telephony platform;
directing application control to a first module of an application of the account;
passing application control from the first module to a second module of the account through a linking system;
metering use of the first module and the at least second module independently;
wherein directing application control to a first module of the account includes directing control to an initial universal resource identifier (URI) of the first module; and
wherein passing application control to the second module through a linking system includes directing application control to an initial URI of the second module; and
wherein passing control to a second module includes receiving from the first module a module identity code of the second module, wherein the module identity code is received at a dispatcher engine of the telephony platform; and further comprising the dispatcher engine converting the module identity code to the initial URI of the second module; and wherein the dispatcher engine directs application control to the initial URI of the second module.

2. The method of claim 1, wherein an application request is a telephony call request.

3. The method of claim 1, wherein an application request is a text message request.

4. The method of claim 1, wherein passing control to a second module includes receiving from the first module a redirecting URI to specify the initial URI of the second module.

5. The method of claim 1, further comprising assigning a usage model of the account for the first module and the second module; and prior to directing application control to the initial URI of the second module, a policy engine of the telephony platform verifying permission for the account to use the second module based on the usage model and metered use of the second module.

6. The method of claim 5, wherein the usage model of the second module is for unlimited use in a time period, and the metering of application control includes comparing the time period of unlimited use to the current time.

7. The method of claim 1, further comprising a billing engine transferring payment from an account based on a usage model for the first module and the second module and the independently metered usage of the first module and the second module; and wherein verifying permissions includes verifying the account has satisfied a billing requirement associated with the usage model.

8. The method of claim 1, further comprising charging the account for combined usage of the first module and the at least second module as indicated by the metered use of the first module and at least second module; and distributing payment to an entity of the first module based on usage record of the first module and distributing payment to an entity of the second module based on a usage record of the second module.

9. The method of claim 1, wherein the metering application control of the first module uses a metric different from the metric used for metering application control of the at least second module.

10. The method of claim 1, wherein the metering is triggered through the passing of application control from the first module to a second module through the linkage system.

11. The method of claim 1, further comprising independently metering telephony platform application programming interface (API) use outside of application control for the first module and the at least second module.

12. The method of claim 1, further comprising sending a notification to an entity of the module in response to telephony platform activity.

13. The method of claim 1, further comprising sharing configuration state between the first module and at the least second module, wherein the configuration state is set for every application request for operation of the application containing the first module and second module.

14. The method of claim 13, wherein sharing configuration state includes sharing defined keys with parameter values between the first module and the at least second module.

15. The method of claim 14, wherein an instance of application control may additionally have shared configuration state.

16. A method for running an accountable multi-module telephony application comprising:
  receiving an application request for a number associated with an account of a telephony platform;
  directing application control to an initial universal resource identifier (URI) of a first module of an application of the account;
  passing application control from the first module to an initial URI of a second module of the account through a linking system, wherein passing control to a second module includes receiving from the first module a module identity code of the second module, wherein the module identity code is received at a dispatcher engine of the telephony platform; and the dispatcher engine converting the module identity code to the initial URI of the second module; and wherein upon verification of permission for the account to use the second module, the dispatcher engine directs application control to the initial URI of the second module;
  assigning a usage model of the account for the first module and the second module;
  prior to passing application control to the initial URI of the second module, a policy engine of the telephony platform verifying permission for the account to use the second module based on the usage model and metered use of the second module; and
  independently metering application control of the first module and of the at least second module by tracking the module associated with the URI directed application control.

17. A method for supplying use of an application protocol interface (API) for an application on a platform comprising:
  receiving a request to add a first application for use on a platform;
  receiving user account information for the platform;
  receiving usage agreement information for the user account; and
  metering the first application usage for the account;
  permitting use of a platform resource for the user account according to the metered usage and usage agreement information, which includes passing application control to a second application through a linking system, wherein the second application is associated with the user account and has a usage agreement information; and
  wherein passing control to a second application includes receiving from the first module a module identity code of the second module, wherein the module identity code is received at a dispatcher engine of the telephony platform; and the dispatcher engine converting the module identity code to the initial URI of the second module; and wherein upon verification of permission for the account to use the second module, the dispatcher engine directs application control to the initial URI of the second module.

18. The method for claim 17, wherein permitting use of a platform resource for first application of the user account includes a policy engine verifying permission for the account to use the platform resource based on the usage module.

19. The method of claim 17, further comprising charging the user account for metered usage of the platform; and distributing payment to an entity of the first module based on metered usage of the application.

20. The method of claim 17, wherein permitting API usage of the platform resource for the user account includes passing application control to a second application through a linking system, which includes directing application control to an initial URI of the second application, wherein the second application is associated with the user account and has a usage agreement information.

21. The method of claim 17, wherein the platform is a telephony application platform and the application is assigned to a phone number.

22. The method of claim 17, wherein metering the first application platform usage for the account, further comprises metering by tracking universal resource indicators (URIs) of the first application used during application control by the first application of the user account.

* * * * *